United States Patent [19]

Larson

[11] 4,052,368

[45] Oct. 4, 1977

[54] WATER-DISPELLABLE HOT MELT POLYESTER ADHESIVES

[75] Inventor: Wayne K. Larson, Maplewood, Minn.

[73] Assignee: Minnesota Mining and Manufacturing Company, St. Paul, Minn.

[21] Appl. No.: 697,968

[22] Filed: June 21, 1976

[51] Int. Cl.² .............................................. C08G 63/68
[52] U.S. Cl. ............................ 260/75 S; 260/29.2 E; 260/860; 428/481
[58] Field of Search .............. 260/75 R, 75 S, 29.2 E, 260/860

[56] References Cited

U.S. PATENT DOCUMENTS

| | | | |
|---|---|---|---|
| 3,185,671 | 5/1965 | Horn | 260/75 S |
| 3,597,264 | 8/1971 | Sirota | 260/33.4 R |
| 3,639,352 | 2/1972 | Katsuura et al. | 260/75 S |
| 3,734,874 | 5/1973 | Kibler et al. | 260/29.2 E |
| 3,753,944 | 8/1973 | Sirota | 260/33.2 R |
| 3,779,993 | 12/1973 | Kibler et al. | 260/75 S |
| 4,016,332 | 4/1977 | Anderson et al. | 260/75 S |

*Primary Examiner*—Lucille M. Phynes
*Attorney, Agent, or Firm*—Cruzan Alexander; Donald M. Sell; Richard E. Brink

[57] ABSTRACT

Water-dispellable, optionally pressure-sensitive hot melt resins having superior heat-aging properties are made by reacting (1) diols, of which at least 90% are polycaprolactonediol and/or monoalkylene diols, with (2) dicarboxylic acids, of which up to 95% are aliphatic, 5-25% are aromatic and have a magnesium or alkali metal sulfonate group attached to the ring, and the balance are non-sulfonated aromatic. These resins, which find use as hot melt adhesives for book binding and other purposes, can be readily dissolved or dispersed in a paper beater during a repulping operation. The product can be wound upon itself and supplied in roll form, optionally reinforced by a fibrous membrane.

13 Claims, No Drawings

WATER-DISPELLABLE HOT MELT POLYESTER ADHESIVES

BACKGROUND OF THE INVENTION

This invention relates to novel hot melt adhesives and to methods of making them.

Hot melt adhesives are widely used in connection with paper products, e.g., for binding a stack of paper sheets together along one edge to form a book, sealing the flaps of conventional corrugated cardboard boxes, etc. Such adhesives, which are normally tack-free solids at room temperature, become fluid when heated, enabling them to be quickly applied and equally quickly solidified to form a firm adhesive bond.

Because of the growing emphasis on recycling waste or scrap fiberboard products, there is a commercial appetite for a hot melt adhesive having the additional characteristics of being soluble or dispellable in water. With such an adhesive, fiberboard products having hot melt adhesives in or on them could be thrown into a conventional fiberboard box repulping operation, where the adhesive would be dispersed or dissolved. Such an adhesive would thus avoid the formation of lumps which would clog screens in the repulping machinery or appear in the final fiberboard as blotches which may weaken the product or cause it to be unsightly. On the other hand, it is important that the adhesive be reasonably insensitive to atmospheric moisture and stable at high temperatures for long periods of time in order to endure commercially practical application techniques.

Various attempts have been made to provide a water-soluble hot melt resin having the aforementioned properties. For example, U.S. Pat. No. 3,597,264 discloses a remoistenable — but not water-soluble — hot melt which is a blend of partially hydrolyzed polyvinyl acetate and plasticizer. U.S. Pat. No. 3,753,944 discloses a water-soluble hot melt which is a blend of high and low molecular weight polyoxyethylene compounds and related materials, but this product is soft and not sufficiently strong for use in many of the applications where hot melts are employed.

U.S. Pat. Nos. 3,734,874 and 3,779,993 disclose water-dissipatable meltable polyester adhesives formed by reacting monomer components which include 100 moles of dicarboxylic acid and 100 moles of diol, at least 15 mole % of the diol being poly(ethylene glycol), some of the difunctional monomers containing a metal sulfonate group attached to an aromatic nucleus. While these adhesives may be effective in some applications, they suffer degradation upon prolonged exposure to the high temperatures of practical adhesive processing techniques and lack resistance to high humidities.

It has been found by others that water-dispellable hot melt resins can be made by reacting certain diols with alpha, beta-unsaturated dicarboxylic acid ans thereafter reacting the unsaturated polyesters with solubilizing agents. These resins are extremely useful for book binding, but the two-step manufacturing process requires great care to arrive at products having the viscosity required for fiberboard box sealing.

It is believed that prior to the present invention, there existed no easily prepared hot melt adhesive possessing the combined attributes of high strength at a wide range of humidities, resistance to high temperatures aging, and water solubility or dispellability.

SUMMARY

The present invention provides a water-dispellable hot melt adhesive consisting essentially of a polyester resin which is normally solid at 20° C., has a ball-and-ring softening point greater than 35° C., fuses below about 200° C., has a melt viscosity of 1,000-500,000 cps at 175° C., and has an intrinsic viscosity between about 0.1 and about 1.0, preferably 0.2-0.6. The polyester resin, which can be prepared in a one-step polymerization process, contains substantially equimolar amounts of (1) the residue of dicarboxylic acid molecules, essentially including a minor amount of metal sulfonate salts of aromatic dicarboxylic acid molecules, and (2) the residue of diol molecules. The polyesters are dispellable in ordinary tap water, although occasionally the best results are by using warm (120°-150° F.) tap water; surprisingly they retain a substantial amount of their strength at high humidities.

Of the dicarboxylic acid molecules, 0 to 95 mole percent are aliphatic dicarboxylic acids having at least two carbon atoms between carboxyl groups and normally having an average of 4-10 carbon atoms; 0 to 95 mole percent are non-sulfonated aromatic dicarboxylic acid molecules, no more than 85 mole percent being terephthalic acid; and 5 to 25 mole percent are aromatic dicarboxylic acid molecules in which magnesium sulfonate or an alkali metal sulfonate group is attached to an aromatic ring. In the absence of the sulfonate group, the polyester lacks water-dispellability.

It should be understood that the use of the corresponding acid anhydrides, esters, and acid chlorides of acids is included in the term "dicarboxylic acid." Examples of esters include dimethyl 1,4-cyclohexanedicarboxylate; dimethyl 2,6-naphthalenedicarboxylate; dibutyl 4,4'-sulfonyldibenzoate; dimethyl isophthalate; dimethyl terephthalate; and dibutyl terephthalate. Copolyesters may be prepared from two or more dicarboxylic acids or derivatives thereof.

Where the term "aromatic dicarboxylic acid" is used herein, it is intended to embrace the phthalic acids (orthophthalic, terephthalic, isophthalic), naphthalic acids (e.g., 1,4- or 2,5-naphthalene dicarboxylic), diphenic acid, oxydibenzoic acid, anthracene dicarboxylic acids, 2,2'-benzophenone dicarboxylic acid and the like. Generally the major portion of the non-sulfonated aromatic dicarboxylic acids are preferably selected from those acids in which the carboxyl groups are located at the maximum distance from each other, e.g., terephthalic acid, 2,6-naphthalene dicarboxylic acid, and so on. Minor amounts of other isomers of such acids reduce crystallinity and can be included to improve flexibility, but excessive amounts of such isomers unduly increase humidity sensitivity.

The term "aliphatic" as used herein is intended to embrace cycloaliphatic materials. Among the aliphatic dicarboxylic acids which may be used in the practice of the invention are glutaric, succinic, adipic, trimethyladipic, pimelic, suberic, azelaic, sebacic, and 1,4-cyclohexanedicarboxylic.

Among the alkali metal salts of sulfonated aromatic dicarboxylic acids or derivatives which may be employed in the practice of the invention are those of phenyl-3,5-dicarbomethoxybenzenesulfonate, 2,6-dimethylphenyl-3,5-dicarbomethoxybenzenesulfonate, 1-naphthyldicarbomethoxybenzenesulfonate, phenyldicarbobutoxybenzenesulfonate and 2-naphthyldicarbomethoxybenzenesulfonate. Particularly good results are achieved when the difunctional sulfo-monomer component is 5-sodiosulfoisophthalic acid or its esters.

The 100 mole percent of diol molecules consist essentially of 0-100 mole percent monoalkylene glycol containing 2-10 carbon atoms, 0-100 mole percent polycaprolactone diol, desirably having a molecular weight of 500-2000, and no more than 10 mole percent polyoxyalkylene glycol. Preferably the monoalkylene glycol is ethylene glycol, although one may use other monoalkylene glycols containing up to ten carbon atoms, e.g., propylene glycol, 1,3-propanediol, 2,4-dimethylhexane-1,3-diol, 2,2-dimethyl-1,3-propanediol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, and p-xylylenediol. It has been found that polyesters containing diol residues of less than 90 mole percent monoalkylene glycol and/or polycaprolactone diol (e.g., 80 mole percent ethylene glycol and 20 mole percent diethylene glycol) degrade upon exposure to high temperature for extended periods of time (e.g., 4 days at 345° F., or about 175° C.), as evidenced by a decrease in both tensile strength and intrinsic viscosity. Polyesters of the invention, the diol residues of which consist of more than 90 mole percent residues of polycaprolactonediol, monoalkylene glycol, or combinations thereof (e.g., 95 mole percent ethylene glycol and 5 mole percent diethylene glycol), on the other hand, maintain tensile strength and intrinsic viscosity — or actually increase in both — under the same high temperature conditions. In constrast to the prior art products, the polyesters of the invention also maintain a usefully high percentage of their dry tensile strength at high humidities.

The polyesters of this invention are prepared by standard techniques, typically involving the reaction of dicarboxylic acids (or diesters, anhydrides, etc. thereof) with monoalkylene glycols and/or polycaprolactonediol in the presence of acid catalysts (e.g., antimony trioxide), utilizing heat and pressure as desired. Normally, an excess of the glycol is supplied and removed by conventional techniques in the later stages of polymerization. When desired, a hindered phenol antioxidant may be added to the reaction mixture to protect the polyester from oxidation. To ensure that the ultimate polymer will contain more than 90 mole % of the residue of monoalkylene glycols and/or polycaprolactonediol, a small amount of buffering agent (e.g., sodium acetate, potassium acetate, etc.) is added. While the exact reaction mechanism is not known with certainty, it is thought that the sulfonated aromatic dicarboxylic acid promotes the undesired polymerization of the glycol per se and that this side reaction is inhibited by a buffering agent.

Where polycaprolactonediol residues are to be present in the ultimate polyester, the reaction vessel may be initially charged with a prepolymerized polycaprolactonediol, polycaprolactone, or caprolactone monomer, appropriately adjusting the quantity of diol to conform to the requisite stoichiometry. In any event, the reaction product will contain the residues of polycaprolacetonediol and relating the reaction rates of the charged monomers will generally cause such residues to have an average molecular weight in the range of about 500-2000.

In order to ascertain with precision the comparative amounts of monoalkylene glycol and polyoxyalkylene glycol present in the polymer, the following analytical procedure is employed: A 500-ml round bottom flask, fitted with condenser and heating mantle, is charged with 5.0 g water-dispellable polyester, 4.33 g potassium hydroxide, 50 ml distilled water, 50 ml absolute ethanol and boiling chips. The system is refluxed for 15 hours, cooled to room temperature, and 50 to 100 ml absolute ethanol added to precipitate the product salts. The hydrolysate is filtered through a glass fritted Buechner funnel (25-50 micron pore size) and the mother liquor concentrated to about 25 ml. Approximately 25-50 ml of absolute ethanol is then added to precipitate the remaining salts. The precipitate is removed by filtering, and the filtrate concentrated to 15 ml and transferred to a sample vial.

The concentrated filtrate is injected onto a gas chromatographic column (neopentyl glycol succinate on a white high performance support) at 200° C. set in a gas chromatograph equipped with a hydrogen flame detector. Areas of peaks corresponding to ethylene glycol and diethylene glycol are then compared with the areas of peaks generated from a series of standard mixtures of pure ethylene glycol and pure diethylene glycol in order to determine the actual mole percent diethylene glycol present in the water-dispellable polyester.

The polyesters of the invention are solids at room temperature and can be melted by conventional means in the range of 40° C. to 200° C. for application as hot melt adhesives. Polyesters having intrinsic viscosities below 0.1 are generally of low molecular weight and have insufficient strength for use as hot melt adhesives. Polyesters having intrinsic viscosities above about 1.0 provide excellent adhesives, but generally have such high melt viscosity as to render their use undesirable with existing application equipment. To facilitate hot melt application and achieve good adhesive strength, it is preferable to use polyesters having intrinsic viscosities in the approximate range of 0.2 to 0.6.

The polyester resins of the invention normally have ball-and-ring softening points greater than 35° C. and less than 200° C. When characterized on a melting point apparatus, these resins typically soften at temperatures somewhat below the ball-and-ring softening point and flow at approximately the ball-and-ring softening point.

Operating within the framework of the invention, numerous modifications can be made to attain specific objectives. For example, for a given intrinsic viscosity, polyesters of high aromatic dicarboxylic acid content have high melt viscosities, tensile strengths, and melting points. Correspondingly, polyesters of low aromatic dicarboxylic acid content have greater flexibility. Polymers prepared from aliphatic dicarboxylic acids with six or more carbon atoms display greater hydrophobic character in cold water but are dispellable in warm water. As a compromise based on a consideration of cost, stability, flexibility and ultimate strength, polyesters based on about 40-75% adipic acid, 5-10% sodium sulfoisophthalic acid, and the balance terephthalic acid, have been found highly satisfactory.

Many adhesive compositions of the invention, although readily soluble in cold water immediately after their preparation or application from the melt, become insoluble after standing for a period of time ranging from many hours to several weeks. While the reason for this phenomenon is not known with certainty, it is believed to be caused by formation of microcrystalline regions in the composition. Such compositions, which remain dispellable in hot water and can be temporarily restored to cold water dispellability by heating them to their melting point, are particularly useful for high humidity use.

If desired, the polyesters of the invention may be blended with plasticizers (e.g., polyoxyethylenearyl ether), tackifiers (e.g., heat stabilized wood rosin), pigments, dyes, modifiers and other materials known to the art, to obtain adhesives having modified performance characteristics. In like manner, finely divided fillers such as clay, colloidal silica, titanium dioxide, etc. may be added so long as they do not interfere with fiberboard box repulping operations. Tacky and pressure-sensitive hot melt adhesive may be especially useful in the manufacture of adhesive tapes.

While the hot melt adhesives of the invention may be coated directly by conventional techniques, it has been found that selected resins can be formed into self-sustaining films, desirably would upon itself in roll form, and employed in water-dispellable film products. Such resins may also be coated on, or otherwise reinforced by, a membrane (e.g., a water-disintegrable fibrous membrane such as paper). Tapes prepared by coating such resins on a strong sheet backing can also be used to seal cartons; if the backing is water-insoluble it can still be readily separated in a repulping operation.

In evaluating the physical properties and performance characteristics of polymers prepared for use as hot melt adhesives, it has been found helpful to employ several tests, the details of which are set forth below:

Solution Viscosity: "Inherent viscosity" determinations are made at 25° C. with a Cannon Viscometer, size 200 A584, using as a solvent a 60:40 (weight %) phenol:-tetrachloroethane blend. Inherent viscosities are determined at three concentrations (0.10, 0.20, and 0.40 gram per 100 ml), plotted as "specific" viscosity/concentration versus concentration, and extrapolated to zero concentration by the linear least squares analysis to obtain the intrinsic viscosity.

Ball-and-Ring Softening Point: This test, which is described in detail in ASTM Test Designation E28-67T, generally consists of filling a ring with the resin to be tested, suspending the ring in a horizontal position in an inert liquid, placing a ball on top of the resin, gradually heating the liquid, and noting the temperature at which the resin has sagged 1 inch (about 25 mm).

Softening Point and Flow Point: A 0.125 × 0.125 × 0.002 inch (3mm × 3mm × 0.05mm) sample of water-dispellable polyester film is interposed between two glass cover slides and the system placed on the heating block of a Fisher Johns Melting Point Apparatus. The temperature is raised about 10° C. per minute while moderate pressure is applied by hand with a wooden stick to the upper cover slide. When the polyester begins to ooze without exhibiting elastic behavior (i.e., it does not return to its original shape when the pressure is relieved) the temperature corresponding to this point is recorded as the "softening point" (not to be confused with the previously described ball-and-ring softening point). The temperature at which the polyester flows readily under pressure is recorded as the "flow point". This temperature, which generally approximates the ball-and-ring softening point, may be considered the fusion temperature.

Tensile: Tensile data are obtained at 22° C. on 0.5 inch × 2 inch × 0.040 inch (about 12.7 mm × 50 mm × 1 mm) portions of films of polyester prepared by pressing the polymer between 0.040 inch (about 1 mm) shims at 200°–220° F. (about 95°–105° C) and 5000–10,000 lbs. (about 2250–4500 kg) ram pressure for 3 minutes. The films are dried in a desiccator over $CaSO_4$ for a minimum of 1 day prior to testing and remain there until just before the test. The films are then gripped by the upper and lower jaws of an "Instron" tensile testing machine, set at a separation of 1 inch (about 25 mm), and the jaws moved apart at 12 inches (about 30 cm) per minute. Tensile data recorded are those found at break.

Water-Dispellability: Approximately 1 gram of the putative hot melt resin is put in a 125 ml jar and 99 ml of 20° C. tap water is added. A cap is placed on the jar, which is then mounted on a reciprocating shaker for 2 hours. If no pieces of resin remain, the resin is termed water-dispellable. If some pieces of the resin remain, the mixture is transferred to a 250-ml beaker and heated to about 180° F. (80° C.) for 20 minutes. If no pieces of resin then remain, the resin is deemed water-dispellable. If, however, pieces of the resin can still be discerned, the resin is considered not to be water-dispellable.

Heat-Aging: Intrinsic viscosities and tensile strengths are run before and after aging. After initial values are obtained, the polymers to be tested are transferred from the desiccator to individual Petri dishes lined with polytetrafluoroethylene film, placed in an oven at 345° F.* (about 175° C.) and allowed to age for 96 hours. The samples are then transferred to a desiccator until cool, allowed to dry for an additional day, and intrinsic viscosity and tensile strength measurements made again.

*This aging cycle was selected because it is typical of the temperatures encountered in hot melt coating during a 5-day 3-shift commercial coating operation.

DESCRIPTION OF PRESENTLY PREFERRED EMBODIMENTS

Understanding of the invention will be further enhanced by referring to the following illustrative but non-limiting examples, in which all weight and mole percentages are based on the total weight or moles of discarboxylic acid charge unless otherwise indicated.

EXAMPLE 1

A 1000-ml three-necked, round-bottom flask equipped with a sealed stirrer, thermometer, inert gas inlet, water trap and a condenser, was charged with 26.8 grams (10 mole %) 5-sodium sulfoisophthalic acid (SSIP), 47.2 grams (40 mole %) succinic acid, 83.1 grams (50 mole %) terephthalic acid, 124.1 grams (200 mole %) ethylene glycol, 1.5 grams sodium acetate trihydrate, 0.16 gram (0.1 weight %) antimony trioxide, and 0.16 gram (0.1 weight %) tetrakis [methylene 3-(3',5'-di-tertbutyl-4'-hydroxyphenyl) propionate] methane antioxidant (commercial antioxidant available from Ciba-Geigy Corp. under the trade designation "Irganox" 1010). The flask and contents were flushed with nitrogen to remove air and thereafter during the esterification an inert atmosphere was maintained by passing a slow flow of dry nitrogen through the apparatus. The reaction mixture was stirred and heated between 180° C. and 200° C. for 97 minutes, or until the pot temperature rose to 200° C., indicating that most of the water from the esterification reaction had been removed to the water trap; over a 30-minute period, the temperature was raised to 225°–235° C. and maintained there while pressure was slowly reduced to 0.18–0.25 Torr over a period of 25 minutes. The system was then brought to atmospheric pressure with nitrogen and the hot polymer drained into a polytetrafluoroethylene-coated pan, yielding a water-dispellable resin having an intrinsic viscosity of 0.270 and a ball-and-ring softening point of 130° C. The resin started to soften at 115° C. and flowed readily at 160° C.; on analysis, it was found to be a polyester polymer having diol residue content of 93.4% ethylene glycol and 6.6% diethylene glycol.

EXAMPLE 2

The apparatus used was the same as that described in Example 1, but the procedure was modified slightly.

The 1000-ml flask was charged with 13.4 grams (5 mole %) SSIP, 131.5 grams (90 mole %) adipic acid, 8.3 grams (5 mole %) terephthalic acid, 186.2 grams (300 mole %) ethylene glycol, 1.0 gram potassium acetate, 0.08 gram (0.05 weight %) antimony trioxide, and 0.16 gram (0.1 weight %) "Irganox" 1010 antioxidant. The major portion of the esterification was carried out between 182° and 198° C. for 3 hours, 15 minutes, after which the system was set up for reflux for 3 hours, 13 minutes, while the temperature of the reaction mixture rose to 228° C. The apparatus was then arranged for distillation as before and vacuum was applied (0.25–0.3 Torr) while the temperature was raised. When the temperature reached 241° C. (after 42 minutes under vacuum), nitrogen was introduced to restore atmospheric pressure. The resulting resin was then drained as described previously, yielding a hard, waxy water-dispellable polyester having an intrinsic viscosity of 0.224 and a ball-and-ring softening point of 39° C. The resin softened visibly at 35° C. and flowed readily at 43° C.

EXAMPLE 3

This example describes the use of diesters instead of dicarboxylic acids in the polyester synthesis. Mole and weight percentages are based on the total diester charge.

The apparatus described in Example 1 was charged with 29.6 grams (10 mole %) SSIP-dimethyl ester, 69.7 grams (40 mole %) dimethyl adipate, 97.1 grams (50 mole %) dimethyl isophthalate, 124.1 grams (200 mole %) ethylene glycol, 2.96 grams sodium acetate trihydrate, 0.20 gram (0.1 weight %) antimony trioxide, 0.20 gram (0.1 weight %) zinc acetate, and 0.33 gram (0.15 weight %) "Irganox" 1010 antioxidant. The reaction took place between 155° and 180° C. over a period of 94 minutes, after which time the temperature was raised to 230° C. and the pressure reduced. Pressure was maintained at or below 0.6 Torr while the temperature rose to 250° C. in 34 minutes. The system was brought to atomspheric pressure with nitrogen, and the reaction product drained. The resultant resin was a hard yet flexible, water-dispellable polyester having an intrinsic viscosity of 0.245 and a ball-and-ring softening point of 121° C.; it softened at 95° C. and flowed readily at 125° C.

EXAMPLE 4

A water-dispellable polyester whose composition is based on the residues of 95 mole % adipic acid, 5 mole % SSIP and 100 mole % ethylene glycol, prepared as described in the preceding examples, was put in a hot melt gun dispenser and applied at 200° F. (about 93° C.) to the manufacturer's seam and bottom flaps of a fiberboard box construction. Following closure of the box, hand pressure was applied for ten seconds and the box allowed to stand to see if the seams would fail by "popping" open. No failures were observed.

EXAMPLE 5

One gram of a water-dispellable polyester containing the residues of (1) 10 mole % SSIP, 60 mole % adipic acid, 30 mole % terephthalic acid and (2) 93 mole % ethylene glycol and 7 mole % diethylene glycol was dissolved in 99 grams distilled water. Ion exchange was accomplished by adding 0.25 gram magnesium acetate tetrahydrate dissolved in 100 grams distilled water. The resultant mixture was cloudier than either of the separate solutions, but the polymer remained dispersed.

Set forth below are tables showing the raw materials charged* to a reaction vessel to prepare various polyester resins in accordance with the invention. For comparative purposes, there are shown the raw materials charged to prepare various prior art compositions; such compositions are identified by upper case letters. For convenience, the following abbreviations are employed:

BD—1,4-butanediol
CDM—1,4-cyclohexanedimethanol
DEG—diethylene glycol
EG—ethylene glycol
TEG—triethylene glycol
HMD—hexamethylene diol
PLCD—polycaprolacetonediol
PD—1,3-propanediol
IPA—isophthalic acid
PA—phthalic anhydride
SSIP—5-sodium sulfoisophthalic acid
TPA—terephthalic acid
adi — adipic acid
pim — pimelic acid
seb — sebacic acid
suc — succinic acid In each case, the resultant polyester resin was water-dispellable unless otherwise indicated.

*The mole percentages of ethylene glycol, diethylene glycol and triethylene glycol residues in the finished polyester resin were determined analytically; these percentages are reported in the tables.

TABLE I

| | Mole % acids in polymer | | | Mole % glycols in polymer | | | Intrinsic Viscosity | Effect of Humidity on Tensile Strength Tensile strength, N/cm², | | | Tensile strength, % of 0% R.H. Value | |
|---|---|---|---|---|---|---|---|---|---|---|---|---|
| Example | adi | TPA | SSIP | EG | DEG | BD | | 0% R.H. | 53% R.H. | 75% R.H. | 53% R.H. | 75% R.H. |
| A (comparison) | 40 | 50 | 10 | 79 | 21 | — | 0.388 | 1,730 | 220 | 16 | 13 | 1 |
| B (comparison) | " | " | " | 83 | 17 | — | 0.348 | 2,160 | 580 | 90 | 27 | 4 |
| 6 | " | " | " | 82 | 3 | 15 | 0.358 | 1,610 | 740 | — | 46 | — |
| 7 | " | " | " | 94 | 6 | — | 0.340 | 2,000 | 1,240 | 383 | 62 | 19 |

Examples 6 and 7 demonstrate the significance of the invention in providing water-dispellable hot melt polyester polymers having utility at elevated relative humidities. Comparison Examples A and B were made in substantially the same manner as Examples 6 and 7, except for the inclusion of diethylene glycol in the monomeric materials charged to the reaction vessel. Example 7 differs from Example 6 primarily in the inclusion of a higher molecular weight monoalkylene glycol. In normal use, boxes sealed with a hot melt adhesive, magazines bound with hot melt adhesives, etc., are commonly exposed to relative humidities of 50% and higher. It is important that, in such circumstances, they continue to perform their intended function in such environments. Thus, although all the examples in Table I qualify as water-dispellable hot melt adhesives, only the adhesives of Examples 6 and 7, which are made in accordance with the invention, retain a substantial degree of their initial strength when subjected to high humidity.

Hot melt adhesives are frequently applied by coating equipment which maintains the adhesive at a molten condition for extended periods of time. In a typical situation, e.g., the binding of magazines, the tank containing adhesive may be held at a temperature of 175° C. throughout one week of continuous operation. During this period of time, some of the adhesive is likely to remain in the holding tank, and it is highly desirable that the quality of the finished product be maintained, i.e., that the adhesive not degrade during its use, so that the quality of the finished product can be held constant.

It is also extremely desirable that, after application, a hot melt adhesive maintain relatively constant quality over a considerable period of time, i.e., that it should not degrade to the point where it is incapable of performing the function for which it was intended. One way to predict whether an adhesive can withstand normal aging for an extended period of time involves subjecting it to an elevated temperature for a shorter period of time.

Table II shows the comparative ability of prior art adhesives A-C inclusive, polyesters D and E (which do not constitute part of the present invention) and adhesives 8-10 of the present invention to resist aging. In each case, the intrinsic viscosity and tensile strength of the adhesive were determined shortly after the adhesive had been prepared. Another sample of each adhesive was then subjected to artificial aging at 175° C. for 96 hours, after which the intrinsic viscosity and tensile strength were again measured.

TABLE II

Effect of Heat Aging on Intrinsic Viscosity and Tensile Strength

| Example | Mole % adipic acid | Aromatic acid Type | Aromatic acid Mole % | Mole % SSIP | Mole % glycols in polymer EG | Mole % glycols in polymer DEG | Intrinsic Viscosity Initial | Intrinsic Viscosity After aging | Intrinsic Viscosity % change | Tensile Strength,N/cm² Initial | Tensile Strength,N/cm² After aging | Tensile Strength,N/cm² % change |
|---|---|---|---|---|---|---|---|---|---|---|---|---|
| A (comparison) | 40 | TPA | 50 | 10 | 79 | 21 | 0.388 | 0.187 | −52 | 1,730 | 746 | −57 |
| B (comparison) | " | " | " | " | 83 | 17 | 0.348 | 0.285 | −18 | 2,150 | 1,130 | −47 |
| C (comparison) | " | " | " | " | 80 | 20 | 0.396 | 0.285 | −28 | 2,130 | 1,300 | −39 |
| D (comparison) | " | " | " | " | 88 | 12 | 0.359 | 0.273 | −24 | 1,940 | 1,640 | −15 |
| E (comparison) | " | " | " | " | 89 | 11 | 0.332 | 0.234 | −30 | 2,060 | 1,440 | −30 |
| 8 | 90 | " | 2 | 8 | 94 | 6 | 0.218 | 0.420 | +93 | 110 | 140 | +27 |
| 9 | 95 | — | — | 5 | 96 | 4 | 0.189 | 0.521 | +176 | 176 | 814 | +360 |
| 10 | 40 | IPA | 50 | 10 | 98 | 2 | 0.245 | 0.273 | +11 | 974 | 1,380 | +42 |

As Table II makes clear, all of the prior art examples show a lowered intrinsic viscosity and tensile strength after aging, whereas all the products of the present invention show an increased intrinsic viscosity and tensile strength after being subjected to identical aging conditions.

It is not practical to set forth all possible combinations of hot melt compositions which fall within the scope of the present invention. Nevertheless, to illustrate some of the variations which can be made without departing from the spirit of the invention, attention is directed to Tables III and IV, showing variations in ratios, starting materials, percentage polyalkylene glycol in the finished polymer, etc. It will be apparent that not all applications for hot melt adhesives impose identical requirements and hence that certain physical characteristics may be more desirable in one circumstance than another.

TABLE III

Typical Hot Melt Polyesters of the Invention

| Example | Aliphatic acid Type | Aliphatic acid Mole % | Aromatic acid Type | Aromatic acid Mole % | Mole % SSIP | Diol Type | Diol Mole % | Intrinsic viscosity | Ball-and-ring Ball-and-softening point, ° C. | Softening temp., ° C. | Flow temp., ° C. | Tensile strength, N/cm² |
|---|---|---|---|---|---|---|---|---|---|---|---|---|
| 11 | adi | 30 | TPA | 15 | 25 | EG | 98.8 | 0.167 | 194 | 73 | 190 | Brittle |
|  |  |  | IPA | 15 |  |  |  |  |  |  |  |  |
|  |  |  | PA | 15 |  | DEG | 1.1 |  |  |  |  |  |
| 12* | " | 40 | TPA | 50 | 10 | EG | 94.2 | 0.340 | 167 | 122 | 172 | 2000 |
|  |  |  |  |  |  | DEG | 5.8 |  |  |  |  |  |
| 13 | " | 50 | " | 40 | 10 | EG | 94.6 | 0.344 | 158 | 70 | 150 | 510 |
|  |  |  |  |  |  | DEG | 5.4 |  |  |  |  |  |
| 14 | " | 60 | " | 30 | 10 | EG | 93.2 | 0.334 | 150 | 56 | 148 | 1940 |
|  |  |  |  |  |  | DEG | 6.8 |  |  |  |  |  |
| 15 | " | 80 | " | 10 | 10 | EG | 92.8 | 0.261 | 110 | 49 | 125 | 170 |
|  |  |  |  |  |  | DEG | 7.2 |  |  |  |  |  |
| 16 | suc | 40 | " | 50 | 10 | EG | 93.4 | 0.269 | 139 | 55 | 43 | Brittle |
|  |  |  |  |  |  | DEG | 6.6 |  |  |  |  |  |
| 17* | seb | 40 | " | 50 | 10 | EG | 90.5 | 0.446 | — | — | — | 1430 |
|  |  |  |  |  |  | DEG | 9.5 |  |  |  |  |  |
| 18 | " | 40 | IPA | 50 | 10 | EG | 9.6 | 0.47 | — | 76 | 102 | 88 |
|  |  |  |  |  |  | DEG | 0.4 |  |  |  |  |  |
|  |  |  |  |  |  | HMD | 90.0 |  |  |  |  |  |
| 19 | adi | 60 | TPA | 30 | 10 | EG | 66.8 | 0.342 | — | 63 | 115 | 390 |

TABLE III-continued

Typical Hot Melt Polyesters of the Invention

| Example | Aliphatic acid Type | Aliphatic acid Mole % | Aromatic acid Type | Aromatic acid Mole % | Mole % SSIP | Diol Type | Diol Mole % | Intrinsic viscosity | Ball-and-ring Ball-and-softening point, °C. | Softening temp., °C. | Flow temp., °C. | Tensile strength, N/cm$^2$ |
|---|---|---|---|---|---|---|---|---|---|---|---|---|
| 20 | " | 60 | " | 30 | 10 | DEG<br>CDM<br>EG<br>PD | 3.2<br>30<br>70<br>30 | 0.329 | 128 | 44 | 87 | 180 |
| 21 | " | 20 | IPA | 70 | 10 | DEG<br>EG<br>DEG | neg.<br>93.7<br>6.3 | 0.259 | 187 | 106 | 173 | Brittle |

*Dispellable in hot water

TABLE IV

Typical Hot Melt Polyesters of the Invention which Contain Polycaprolactonediol

| Ex. | Aliphatic acid Type | Aliphatic acid Mole % | Aromatic acid Type | Aromatic acid Mole % | SSIP Mole % | Diol Type | Diol Mole % | Intrinsic Viscosity | Softening point, °C. | Flow temp., °C. | As prepared T | As prepared E | 50 hrs at 175° C T | 50 hrs at 175° C E | 100 hrs at 175° C T | 100 hrs at 175° C E | 100 hrs at 53% R.H. T | 100 hrs at 53% R.H. E |
|---|---|---|---|---|---|---|---|---|---|---|---|---|---|---|---|---|---|---|
| 22 | adi | 95 | | | 5 | EG<br>DEG<br>PCLD | 90<br>5<br>5 | 0.54 | — | — | 61 | 54 | — | — | — | — | 30 | 40 |
| 23 | pim | 45 | TPA<br>IPA | 20<br>20 | 15 | EG<br>DEG<br>PCLD | 70<br>10<br>20 | 0.29 | 76 | 112 | 23 | 1572 | 49 | 173 | 71 | 130 | 5 | 928 |
| 24 | — | — | TPA | 85 | 15 | EG<br>DEG<br>TEG<br>PCLD | 70<br>4<br>1<br>25 | 0.51 | | | | | | | | | | |
| 25 | — | — | " | 85 | 15 | EG<br>DEG<br>PCLD | 44<br>6<br>50 | 0.58 | 106 | 140 | 143 | 1257 | 29 | 696 | 48 | 645 | 4 | >1200 |
| 26 | — | — | " | 75 | 25 | EG<br>DEG<br>PCLD | 4<br>1<br>95 | 0.60 | 92 | 133 | 183 | 1100 | 32 | 478 | 55 | 415 | 6 | 540 |
| 27 | seb | 80 | IPA | 10 | 10 | EG<br>DEG<br>HMD<br>PCLD | 17<br>3<br>40<br>40 | 0.89 | 93 | 110 | 114 | 1560 | — | — | — | — | 75 | 1600 |
| 28 | " | 70 | " | 20 | 10 | EG<br>DEG<br>PCLD | 15<br>5<br>80 | 1.08 | 76 | 102 | 75 | 2390 | — | — | — | — | 43 | >2900 |
| 29 | " | 40 | " | 50 | 10 | EG<br>HMD<br>PCLD | 25<br>25<br>50 | 0.82 | 98 | 118 | 51 | >1600 | — | — | — | — | — | >2900 |
| 30 | " | 10 | " | 80 | 10 | EG<br>DEG<br>HMD<br>PCLD | 18<br>2<br>60<br>20 | 0.48 | 90 | 106 | 153 | 940 | — | — | — | — | 82 | 1160 |

EXAMPLE 31

A polyester was prepared from the same starting materials as in Example 7, the ethylene glycol:diethylene glycol ratio in the final polymer being 94:6 and the intrinsic viscosity 0.45. To 100 parts of this polyester resin were added 50 parts of heat-stabilized wood rosin having a ball-and-ring softening point of 72° C. and 17 parts polyoxyethylene glycol monophenyl ether having an average molecular weight of about 270. The components were then melted and blended in the conventional manner for preparing hot melt adhesive compositions; the resultant composition not only had the properties of a pressure-sensitive adhesive but also retained the hot melt and water-dispellable attributes of the polyester resin.

Using a coated knife heated to 150° C., the adhesive composition just described was applied to a 2-mil (50 micron) film of biaxially oriented polyethylene terephthalate in a thickness of about 3 mils (75 microns). Upon cooling to room temperature, the coating was tacky and pressure-sensitive and the coated film was useful as a tape product. A strip of this tape was applied to a fiberboard box and firmly bonded thereto by hand pressure. When the tape was then removed, adhesion was sufficiently high that fibers were torn from the box. The application of heat to the tape applied to the box was found to enhance bond strength.

The tape of this Example 31 is usable in repulping operations if provision is made for mechanically removing the polyethylene terephthalate film backing. If paper is employed as the backing, the entire tape is water-dispellable and can be repulped.

It will likewise be apparent that tape can be prepared in accordance with the invention using previously described hot melt adhesives which are not tacky and pressure-sensitive. Such tapes can be applied to a desired substrate and then heated to cause the adhesive to activate and bond to the substrate.

While the water-soluble polyesters of the invention possess the properties of a hot melt resin, it will be apparent that they need not be melted during the course of their being used. Polyesters of the invention may thus be applied as solutions, emulsions or dispersions, depending on the particular use to which they are put. When applied other than from a melt, the polyesters may contain glass bubbles or numerous other fillers and additives in addition to those previously mentioned.

What is claimed is as follows:

1. A water-dispellable strong hot melt adhesive, resistant to degradation upon continued exposure to high temperatures and functional at high humidities, consisting essentially of a polyester resin which is normally solid at 20° C., has a ball-and-ring softening point greater than 35° C., fuses at a temperature between 35° C. and 200° C., has an intrinsic viscosity in the range of 0.1 – 1.0 and contains substantially equimolar amounts of the residue of
   a. 100 mole percent dicarboxylic acid molecules consisting essentially of
      1. 0–95 mole percent aliphatic dicarboxylic acid having at least two carbon atoms between carboxyl groups and having an average of 4–10 carbon atoms,
      2. 0–95 mole percent aromatic dicarboxylic acid, no more than 85 mole percent being terephthalic acid, and
      3. 5–25 mole percent aromatic dicarboxylic acid in which magnesium sulfonate or an alkali metal sulfonate is attached to an aromatic ring; and
   b. 100 mole percent diol molecules consisting essentially of
      1. 0–100 mole percent of a monoalkylene glycol containing 2 to 10 carbon atoms,
      2. 0–100 mole percent polycaprolactonediol, and
      3. 0–10 mole percent polyoxyalkylene glycol, the sum of the mole percentages of monoalkylene glycol residues and polycaprolactonediol residues being at least 90.

2. The hot melt adhesive of claim 1 wherein said monoalkylene glycol comprises ethylene glycol.

3. The hot melt adhesive of claim 1 wherein at least about 95 mole percent of the diol molecules are ethylene glycol.

4. The hot melt adhesive of claim 1 wherein the aliphatic dicarboxylic acid consists essentially of adipic acid.

5. The hot melt adhesive of claim 1 wherein the aromatic dicarboxylic acid having a sulfonate attached to the aromatic ring is sodium sulfoisophthalic acid.

6. The hot melt adhesive of claim 3 wherein the dicarboxylic acid molecules consist essentially of 40–75 mole percent adipic acid, 5–10 mole percent sodium sulfoisophthalic acid, and 5–55 mole percent terephthalic acid.

7. A sheet material consisting essentially of a layer of the adhesive of claim 1.

8. The sheet material of claim 7 wherein the adhesive layer is a self-supporting film.

9. The sheet material of claim 7 wherein the adhesive layer is reinforced by a membrane.

10. The sheet material of claim 9 wherein the membrane is fibrous and water-disintegrable.

11. The sheet material of claim 7 wherein the adhesive layer is coated on water-insoluble sheet material.

12. The sheet material of claim 7 in which the adhesive layer is normally tacky and pressure-sensitive.

13. The sheet material of claim 12 wound upon itself in roll form.

* * * * *